(12) United States Patent
Murzyn et al.

(10) Patent No.: US 9,223,135 B2
(45) Date of Patent: Dec. 29, 2015

(54) HEAD-UP DISPLAY AND METHOD WITH LIGHT INTENSITY OUTPUT MONITORING

(71) Applicants: DENSO International America, Inc., Southfield, MI (US); DENSO CORPORATION, Kariya (JP)

(72) Inventors: Michael Murzyn, West Bloomfield, MI (US); Chester Peter Dara, Jr., Sterling Heights, MI (US)

(73) Assignees: Denso International America, Inc., Southfield, MI (US); DENSO CORPORATION, Kariya (JP)

( * ) Notice: Subject to any disclaimer, the term of this patent is extended or adjusted under 35 U.S.C. 154(b) by 86 days.

(21) Appl. No.: 13/970,654

(22) Filed: Aug. 20, 2013

(65) Prior Publication Data

US 2015/0057880 A1    Feb. 26, 2015

(51) Int. Cl.
*B60R 1/00*     (2006.01)
*G02B 27/01*    (2006.01)

(52) U.S. Cl.
CPC .......... *G02B 27/01* (2013.01); *G02B 2027/014* (2013.01); *G02B 2027/0118* (2013.01)

(58) Field of Classification Search
CPC ........... B60K 35/00; B60K 2350/2069; G02B 2027/014; G02B 2027/0118; G02B 27/01
USPC ....................................................... 701/36, 45
See application file for complete search history.

(56) References Cited

U.S. PATENT DOCUMENTS

| 4,831,366 A | 5/1989 | Iino |
| 5,034,732 A | 7/1991 | Iino |
| 6,447,132 B1 | 9/2002 | Harter, Jr. |
| 6,789,901 B1 | 9/2004 | Kormos |
| 6,897,892 B2 | 5/2005 | Kormos |
| 7,106,293 B2 | 9/2006 | Pirhonen |
| 2008/0218434 A1* | 9/2008 | Kelly et al. ....................... 345/8 |

* cited by examiner

*Primary Examiner* — Kim T Nguyen
(74) *Attorney, Agent, or Firm* — Harness, Dickey & Pierce, P.L.C.

(57) ABSTRACT

A sensor is configured to monitor an intensity output of a light source of the head-up display and provide a measured actual light intensity value to a controller. The controller is configured to store a target light source intensity value in a computer-readable memory. The controller is configured to compare the measured actual light intensity value to the target light intensity value. The controller is configured to reduce the light intensity output provided at a vehicle operator viewable display surface in a situation where the measured actual light intensity value exceeds the target light intensity value.

20 Claims, 2 Drawing Sheets

HEAD-UP DISPLAY AND METHOD WITH LIGHT INTENSITY OUTPUT MONITORING

FIELD

Figure 1:
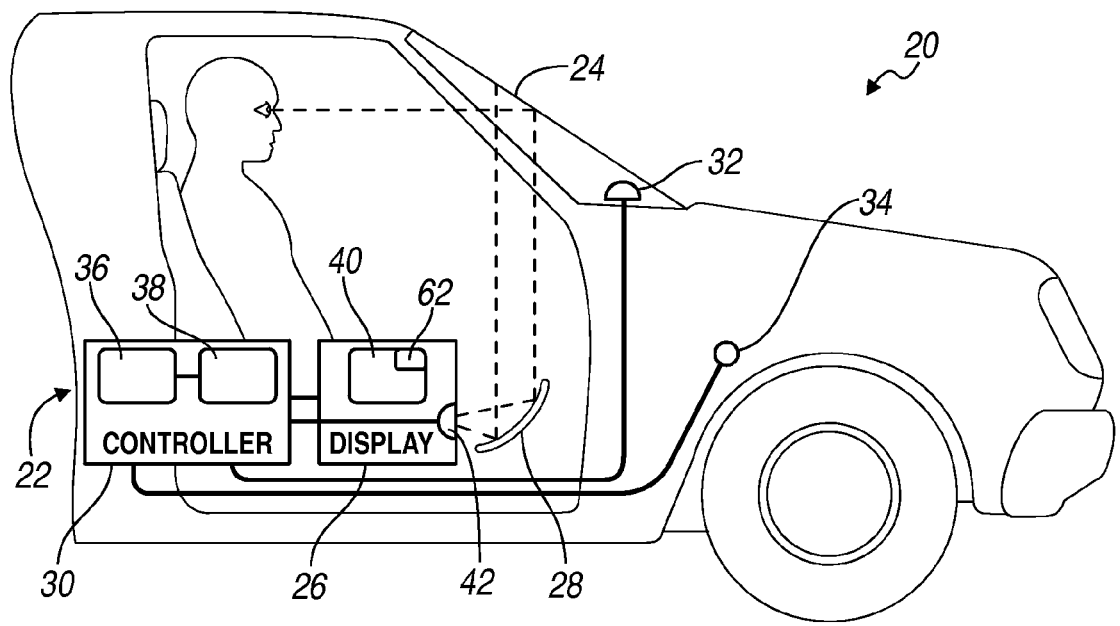

The present disclosure relates to a head-up display, and more particularly to control of the light intensity or brightness of the head-up display.

BACKGROUND

This section provides background information related to the present disclosure which is not necessarily prior art.

Head up displays (HUD) are known and are currently used in many military and commercial aircraft. HUDs are also finding application in automobiles. Conventionally, a HUD unit is mounted in the automobile to project an image in front of the driver. Adapting HUD units for use in automobiles necessitates making the units rugged, reliable, cost effective, and functional in a wide range of environmental and ambient lighting conditions.

One problem with HUDs in automobiles is maintaining satisfactory image illumination over a wide range of ambient lighting conditions. These ambient lighting conditions span from the extremely bright daylight lighting conditions of facing direct sunlight to the very dim nighttime lighting conditions of unlit rural highways. Daylight conditions generally require a bright or high intensity light source so that the projected image is visible in the corresponding bright ambient light conditions. Conversely, nighttime or low light conditions require a dim or low intensity light source to provide a projected image that is safe and comfortable in the corresponding dim ambient light conditions.

In order to meet the demands of bright or high intensity daylight conditions encountered by automobiles, the light source of a HUD can achieve very high intensities. For example, some automobile head-up displays have an image light source that can achieve an intensity of 8,000 candela per square meter or more. This light intensity is great enough to distract a driver, or even temporarily cause night blindness, depending upon the surrounding ambient lighting conditions. Not only can such over-intensity situations be detrimental to the reliability and service life of the HUD, but they can also cause unsafe driving situations.

SUMMARY

This section provides a general summary of the disclosure, and is not a comprehensive disclosure of its full scope or all of its features, nor is everything included in this section necessarily an essential aspect of the disclosure.

In one aspect of the present disclosure a method of limiting a light intensity output of a head-up display for a vehicle is provided. The method includes configuring a sensor to monitor an intensity output of a light source of the head-up display and provide a measured actual light intensity value to a controller. The controller is configured to store a target light source intensity value in a computer-readable memory. The controller is configured to compare the measured actual light intensity value to the target light intensity value. The controller is configured to reduce the light intensity output provided at a vehicle operator viewable display surface in a situation where the measured actual light intensity value exceeds the target light intensity value.

In another aspect of the present disclosure head-up display for a vehicle includes a controller. A sensor is coupled to the controller and is configured to monitor an intensity output of a light source of the head-up display and to provide a measured actual light intensity value to a controller. The controller is configured to store a target light source intensity value in a computer-readable memory. The controller is configured to compare the target light intensity value to the measured actual light intensity value. The controller is configured to reduce the light intensity output provided at a vehicle operator viewable display surface in a situation where the measured actual light intensity value exceeds the target light intensity value.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
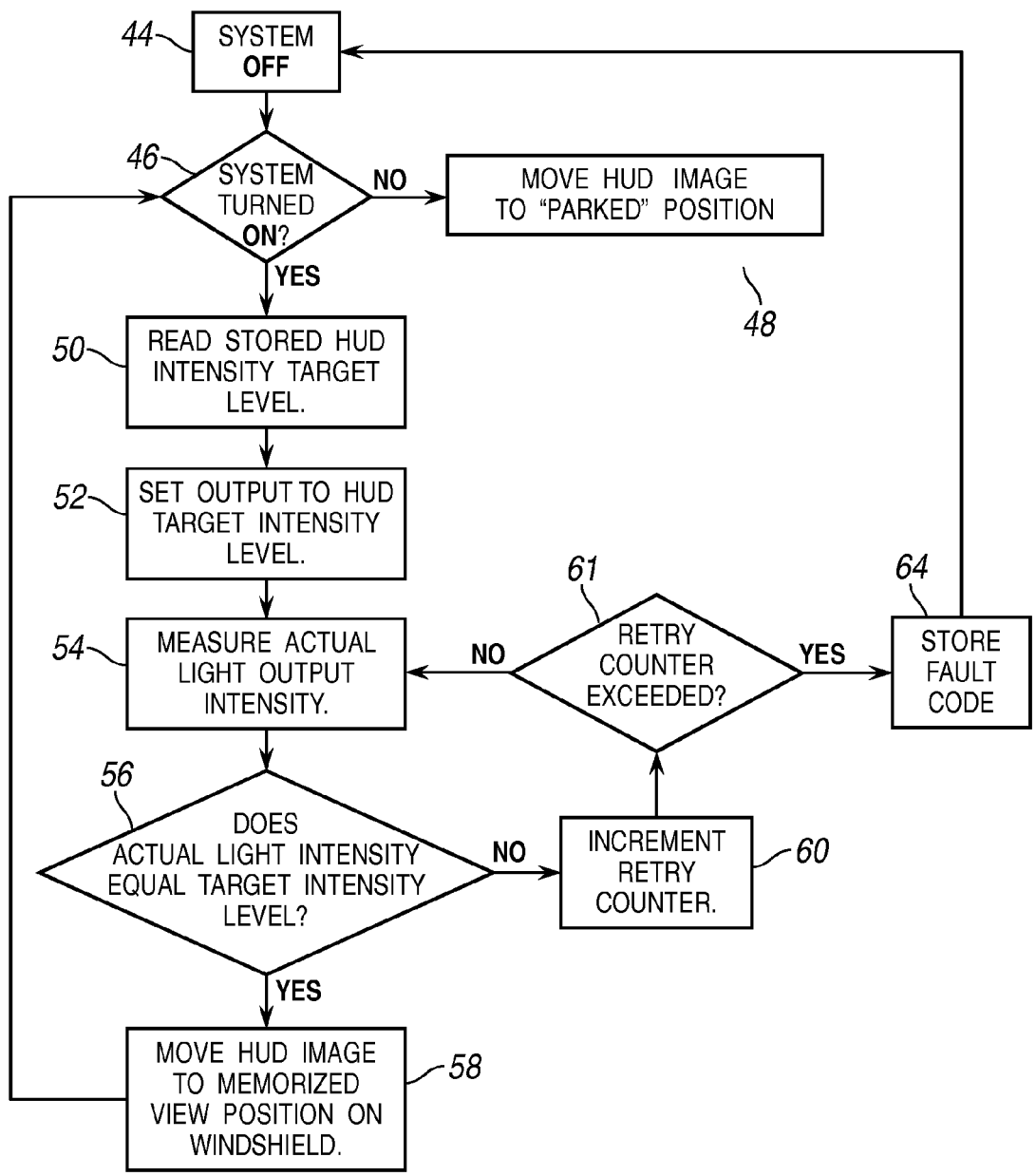

FIG. 1 is a schematic view of an automobile incorporating an exemplary HUD in accordance with the present disclosure; and FIG. 2 is a flow diagram of a process to monitor the light source intensity of an HUD in accordance with the present invention.

Corresponding reference numerals indicate corresponding parts throughout the several views of the drawings.

DETAILED DESCRIPTION

Example embodiments will now be described more fully with reference to the accompanying drawings.

Referring to FIG. 1, an automobile 20 is shown equipped with a head-up display system (HUD) 22. The HUD 22 can communicate information to the vehicle operator that can be projected on a viewable display surface 24 in front of the vehicle operator. For example, the viewable display surface 24 can be the windshield or a transparent plate adjacent the windshield. A display unit (i.e., an image source) 26 can provide and project an image via a mirror 28 to the display surface 24. The HUD 22 can allow the operator to view the image without taking his eyes off of the road.

The HUD 22 can also include a controller 30. The controller 30 can include memory 36, one or more microprocessors 38 and related circuitry. The controller 30 can be an integrated separate component, or can be wholly or partially integrated into the display 26. The controller 30 can be configured to perform various comparisons, calculations, and functions as described herein using software, hardware (e.g., circuitry), or a combination of the two.

The controller 30 can receive data from various systems or sensors 34 and the provided data or extrapolated information can be displayed by the HUD 22. Such sensors can include, for example, a speed sensor, an infrared sensor for detecting objects in the roadway ahead of the vehicle, one or more engine sensors providing engine parameter data, and GPS sensors providing position related data, just to name a few.

The controller 30 formats selected data that it receives into a suitable display signal that is communicated to the display unit 26. Responsive to the display signal, the display unit 26 can generate and project the desired informational image. The display unit 26 can include a light source 40 having an adjustable light intensity. For example, the display unit 26 can be an active matrix liquid crystal display with an adjustable backlight as the adjustable intensity light source 40.

The adjustable intensity light source 40 can include one or more light sources 62 that can be directly or indirectly controlled by controller 30. For example, light sources 62 can include one or more halogen bulbs that produce bright light and one or more florescent lights or LED's that produce dimmer light. Thus, adjusting the light source intensity can include adjusting the power input to one or more light sources 62, or turning one or more of the light sources 62 on or off, or both.

The controller 30 can also receive ambient light data from a light sensor 32. These ambient lighting conditions span from the extremely bright daylight lighting conditions of facing direct sunlight to the very dim nighttime lighting conditions of unlit rural highways. Daylight conditions generally require a bright or high intensity light source 40 so that the projected image is visible in the corresponding bright ambient light conditions. Conversely, nighttime or low light conditions require dim or low intensity light source 40 to provide a projected image that is safe and comfortable in the corresponding dim ambient light conditions.

The controller 30 is configured to adjust the output intensity of the light source 40 based upon ambient light data received from the light sensor 32. Conventional algorithms and processes for providing the HUD display with a brightness or intensity corresponding to sensed ambient lighting conditions are well known. As these are not central to this disclosure, and are already understood by those of skill in the art, they are not described herein.

A sensor 42 is provided to measure the actual output light intensity of the light source 40. A single sensor may be provided for light source 40 or multiple sensors might be provided. For example, multiple sensors 42 can be associated with individual (or groups of individual) light sources 62 of the HUD light source 40.

The sensor 42 can include a light sensor configured to sense the intensity of the light emanating from the HUD light source 40. Such a sensor can be provided within or near the light source 40 or individual (or group of individual) light sources 62 or within or near the display surface 24. Sensor 32 can provide raw data indicative of the actual light intensity output of light source 40 or of some individual light source 62. Controller 30 can be configured to convert the raw data of sensor 42 into a comparable measure matching that of a target light intensity value, or vice versa.

The sensor 42 can also be one or more current sensors configured to sense the level of current flowing through the light source 40 or individual (or group of individual) light sources 62. For example, the sensor 42 can be configured to measure the current flowing through a light-emitting diode (LED) of light source 40. Since current is related to light intensity, such a sensor 42 can provide a measured actual light intensity of some portion or the entire light source 40. Here too, controller 30 can be configured to convert the raw data of sensor 42 into a comparable measure matching that of a target light intensity value, or vice versa.

Referring to FIG. 2, one exemplary process that the controller 30 can be configured to perform in order to monitor the actual light intensity output of the light source 40 is provided. The system is initially off at box 44. When the state of the system is off, at box 46, then the system remains in a "parked" status, where no HUD image is displayed on the display surface 24 as indicated at box 48. In other words, no HUD image is visible to the user.

When the controller 30 detects that the HUD 22 has been turned to an "on" state at box 46, the controller 30 reads the target HUD light source intensity level that has been stored in memory 36 at box 50. This target level has been placed in memory 36 as a result of sensing the ambient light conditions via sensor 32 and calculating the target HUD light source intensity level using a conventional algorithm or process as noted above. The controller 30 can energize the HUD light source 40 to achieve the target light source intensity.

With the light source 40 energized, the controller 30 monitors the actual light intensity output of the light source 40 of the HUD 22 via the output intensity sensor 42 at box 54. As indicated above, light output intensity sensor 42 can be a light sensor, current sensor, or another sensor indicative of the actual light intensity output of light source 40 or some portion thereof.

Measured actual light intensity output data is transmitted from the sensor 42 to controller 30 where it can be stored in memory 36, converted to a comparable measure to the target light source intensity level also stored in memory, and compared to the target source intensity level at box 56. If so, then the controller 30 can move the HUD image to the display surface where it is viewable by the vehicle operator at box 58. The image can be projected on the display surface 24 at a position upon the display surface 24 that is stored in memory 36 as also indicated at box 58. Thus, the HUD image is not permitted to move to the display surface 24 into the view of the vehicle operator unless the proper intensity has been confirmed. This can avoid a situation where the HUD display is too bright for the ambient light conditions, tending to distract, or even temporarily cause night blindness, of the vehicle operator.

This can be accomplished using the loop including boxes 60 and 61. If the measured actual light intensity output does not equal the target light intensity output, then a counter tracking the number of times an out of condition light intensity situation is identified is incremented at box 60. The counter tracking number is compared to a retry counter number stored in memory 36 at box 61. If the retry counter number has not been exceeded, then the actual light intensity output is measured and compared to the target light intensity at boxes 54 and 56.

Once the retry counter has been exceeded, a fault code can be stored as indicated at box 64 and the controller 30 can turn the HUD system 22 off at box 44. Thus, this retry counter loop can avoid shutting the HUD unit 22 down based upon one or two errant readings, for example, as a result of changes to the target intensity level stored in memory 36. The retry counter can be reset periodically; for example, upon the passage of a certain period of time, or after there has been a change in the target intensity level.

Other configurations to avoid unnecessarily shutting down or otherwise "parking" the display are possible. For example, the HUD 22 can be turned off or the display image "parked" if the actual measured intensity of sensor 42 exceeds the target intensity stored in memory 36 by some predetermined percentage, or amount. As another example, the HUD 22 can be turned off or the display image "parked" if a predetermined number of sensors 42 indicate that the target light intensity of has been exceeded. It should be understood that these various examples are not mutually exclusive, and the controller 30 can be configured to combine two or more ways to reduce the possibility of unnecessarily shutting down or "parking" the display.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of limiting a light intensity output of a head-up display for a vehicle comprising:
   configuring a sensor to monitor an intensity output of a light source of the head-up display and provide a measured actual light intensity value to a controller;
   configuring the controller to store a target light source intensity value in a computer-readable memory;
   configuring the controller to compare the measured actual light intensity value to the target light intensity value; and
   configuring the controller to reduce the light intensity output provided at a vehicle operator viewable display surface in a situation where the measured actual light intensity value exceeds the target light intensity value.

2. The method of limiting a light intensity output of a head-up display of claim 1, wherein the measured actual light intensity value provided by the sensor to the controller is a raw data value, and further comprising configuring the controller to convert the raw data value into the measured actual light intensity value allowing direct comparison to the target light intensity value.

3. The method of limiting a light intensity output of a head-up display of claim 1, wherein configuring the sensor comprises providing a current sensor to monitor a current flowing to or through the light source of the head-up display.

4. The method of limiting a light intensity output of a head-up display of claim 1, wherein configuring the sensor comprises providing a light sensor to monitor an intensity of light emanating from the light source of the head-up display.

5. The method of limiting a light intensity output of a head-up display of claim 1, wherein configuring the controller to reduce the light intensity output comprises configuring the controller to turn the light source off.

6. The method of limiting a light intensity output of a head-up display of claim 1, wherein configuring the controller to reduce the light intensity output comprises configuring the controller to place the head-up display (HUD) in a parked state wherein no HUD image is displayed to the driver.

7. The method of limiting a light intensity output of a head-up display of claim 1, wherein configuring the controller to reduce the light intensity output comprises configuring the controller to identify a predetermined number of instances wherein the measured actual light intensity value exceeds the target light intensity value, prior to reducing the light intensity output.

8. The method of limiting a light intensity output of a head-up display of claim 1, wherein configuring the controller to reduce the light intensity output comprises configuring the controller to determine whether the measured actual light intensity value exceeds the target light intensity value by a predetermined amount, prior to reducing the light intensity output.

9. The method of limiting a light intensity output of a head-up display of claim 1, further comprising configuring the controller to compare the measured actual light intensity value to the target light intensity value on start-up prior to initially moving a HUD image to the vehicle operator viewable display surface of the head-up display.

10. The method of limiting a light intensity output of a head-up display of claim 1, wherein the vehicle is an automobile, and further comprising incorporating the head-up display into the vehicle.

11. A head-up display for a vehicle comprising:
    a controller;
    a sensor coupled to the controller and configured to monitor an intensity output of a light source of the head-up display and to provide a measured actual light intensity value to a controller;
    the controller being configured to store a target light source intensity value in a computer-readable memory;
    the controller being configured to compare the target light intensity value to the measured actual light intensity value; and
    the controller being configured to reduce the light intensity output provided at a vehicle operator viewable display surface in a situation where the measured actual light intensity value exceeds the target light intensity value.

12. The head-up display of claim 11, wherein the measured actual light intensity value provided by the sensor to the controller is a raw data value, and wherein the controller is configured to convert the raw data value into the measured actual light intensity value allowing direct comparison to the target light intensity value.

13. The head-up display of claim 11, wherein the sensor comprises a current sensor to monitor a current flowing to or through the light source of the head-up display.

14. The head-up display of claim 11, wherein the sensor comprises a light sensor positioned to monitor an intensity of light emanating from the light source of the head-up display.

15. The head-up display of claim 11, wherein the controller is configured to turn the light source off in order to reduce the light intensity output of the light source.

16. The head-up display of claim 11, wherein the controller is configured to place the head-up display (HUD) in a state wherein no image is provided on the operator viewable display surface in order to reduce the light intensity output.

17. The head-up display of claim 11, wherein the controller is configured to identify a predetermined number of instances wherein the measured actual light intensity value exceeds the target light intensity value, prior to reducing the light intensity output.

18. The a head-up display of claim 11, wherein the controller is configured to determine whether the measured actual light intensity value exceeds the target light intensity value by a predetermined amount, prior to reducing the light intensity output.

19. The a head-up display of claim 11, wherein the controller is configured to compare the measured actual light intensity value to the target light intensity value start-up prior to initially moving a HUD image to a viewable display surface of the head-up display.

20. A vehicle incorporating the head-up display of claim 11, wherein the vehicle is an automobile.

* * * * *